Dec. 17, 1963  S. SCHUMAN  3,114,349
STERILIZATION INDICATORS
Filed April 25, 1960  2 Sheets-Sheet 1
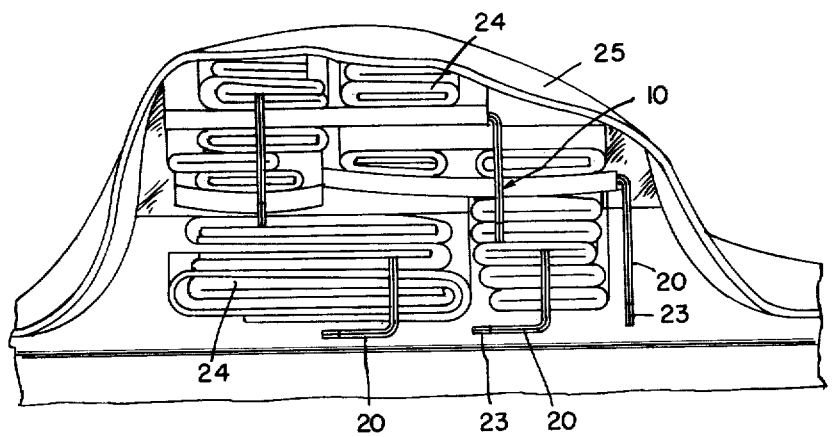
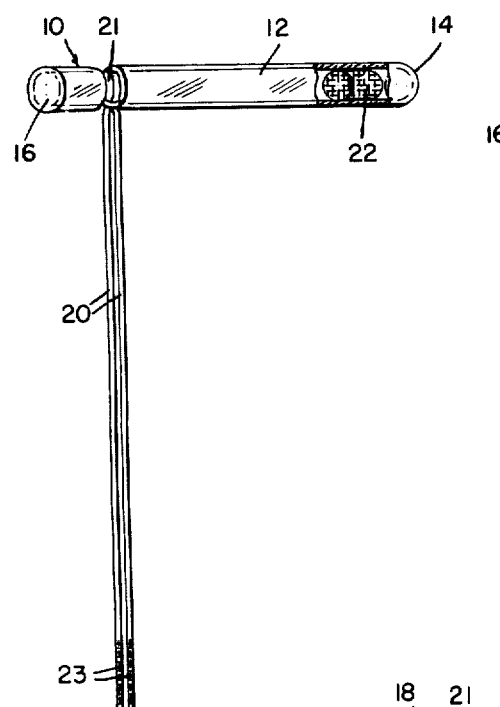
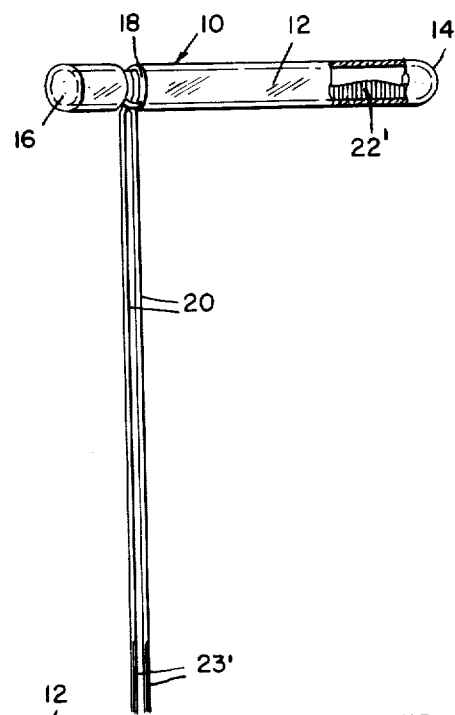
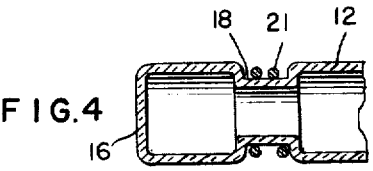
INVENTOR.
Seymour Schuman
BY
Arthur Middleton
ATTY 3,114,349
Patented Dec. 17, 1963

3,114,349
STERILIZATION INDICATORS
Seymour Schuman, New York, N.Y., assignor to Propper Manufacturing Company, Inc., Long Island, N.Y.
Filed Apr. 25, 1960, Ser. No. 24,382
10 Claims. (Cl. 116—114)

This invention relates to the operation of sterilization and more particularly has reference to the sterilization of medicinal and surgical instruments, articles and supplies.

The sterilization of surgical instruments and other articles employed by a surgeon in connection with operations and for other purposes is carried out in the well known autoclave. In the operation of the autoclave for sterilizing surgical equipment one of the principal difficulties encountered is in the elimination of all air from the autoclave chamber which is necessary for the attainment of the proper sterilization of articles therein. To the extent that a percentage of air remains admixed with the steam in the autoclave chamber, the correlation between the pressure and temperature representative of that pressure, becomes erroneous. By this it is meant that when the pressure gauge of the autoclave gives a reading of 15 lbs. gauge (which means 30 lbs., that is 15 lbs. gauge plus 15 lbs. atmosphere) this will indicate a temperature of 250° F. only if all of that pressure is due to steam in the chamber. If as little as 5% of the chamber atmosphere is air entrapped before it can be replaced by the incoming steam, it will make a difference in the temperature. As an example, 15 lbs. gauge pressure due to ⅔ steam and ⅓ air, represents only a temperature of 240° F.

In the designing of autoclaves manufacturers have endeavored to provide a construction which will minimize carelessness in the techniques of the user so that the free area in the autoclave chamber will contain or consist of 100% steam. The design is such that the incoming steam will sweep before it most of the free air which is eliminated or forced out through a vent or trap at the bottom of the rear of the autoclave. However, unless a surgical pack is properly wrapped, complete sterilization of the pack placed in the autoclave may not be accomplished and this is, of course, a situation which the manufacturer of the autoclave, even with the improved design thereof, is unable to foretell, or, in other words, even with a properly designed autoclave a badly wrapped surgical pack may defeat the operation. This is because the user of the autoclave may sometimes wrap a pack in such a manner that a pocket of air is trapped within the same so that even though the in-rushing steam will sweep out of the chamber the free air, it cannot get through several thicknesses of the pack to eliminate trapped air inside of the pack. When this occurs the gauge on the outside of the autoclave will give the pressure in the free area of the autoclave but will not, of course, indicate if a particular area inside the pack has in it entrapped air.

The present invention has for its particular object, in view of the foregoing, to provide a means whereby a determination can readily be made, when a pack is removed from the autoclave and opened, or even before being opened, after being subjected to steam treatment, whether or not an instrument or instruments within the pack have been subjected to the required degree of temperature for proper sterilization.

Still another object of the invention is to provide a means whereby a nurse or other attendant can determine whether or not a pack or packs which presumably have been sterilized have actually in fact been in the autoclave.

The invention broadly contemplates the provision of an elongate article carrying at each end or adjacent to each end a body or a marking comprised of a material which normally may be colorless or substantially colorless and which is of a character to be changed in its color or is of a character to assume a different color when it is subjected to steam sterilization temperature. Such article is used by having one end portion enclosed in a pack in close relationship with instruments or other articles to be sterilized, with the other end portion of the article remaining exposed so that when the pack carrying the sterilization indicator is placed in the autoclave and the latter charged with steam for effecting the desired sterilization of the pack and articles enclosed therein, if the interior of the pack does not attain the desired sterilization temperature, the indicator or the material on the end of the elongated article enclosed in the pack will not be sufficiently heated to cause it to change color and this will immediately be apparent when the pack is removed and opened, whereas if the interior of the pack is free from entrapped air and the articles therein are subjected to the sterilization temperature, then the indicator will be changed in color and this information will indicate that proper sterilization has been effected.

In one embodiment the sterilization indicator takes the form of a strip of ribbon-like material carrying adjacent to each of its ends a heat sensitive ink or other marking which changes color under the effects of proper temperature, and in another embodiment the sterilization indicator takes the form of a transparent capsule of glass having therein a fusible pellet with a cord attached to the capsule and having its free end colored or provided with a heat sensitive ink which will change color under the effects of the sterilization temperature and wherein the fusible pellet also is charged with a heat sensitive substance which assumes an informative hue when it is subjected to the sterilization temperature.

As this invention may be embodied in several forms without departing from the spirit or essential characteristics thereof, the present embodiments are therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

In the drawings:

FIG. 1 illustrates diagrammatically a number of bodies representing wrapped packs of surgical instruments or other articles to be sterilized, showing the outer or exposed ends of sterilization indicators formed in accordance with one embodiment of the invention, associated with the several packs;

FIG. 2 is a view in perspective of the said one embodiment of the invention, showing a transparent closure with portions being broken away, and illustrating the heat sensitive material associated with the two ends of the article prior to the subjection thereof to sterilization temperatures;

FIG. 3 is a view corresponding to FIG. 2 and illustrating the changed color or hue of the indicator substances after being exposed to sterilization temperatures;

FIG. 4 is an enlarged detail sectional view taken in a longitudinal plane, medially of the circumferentially channeled end portion of the capsule in which the fusible pellet is enclosed;

Figure 5:
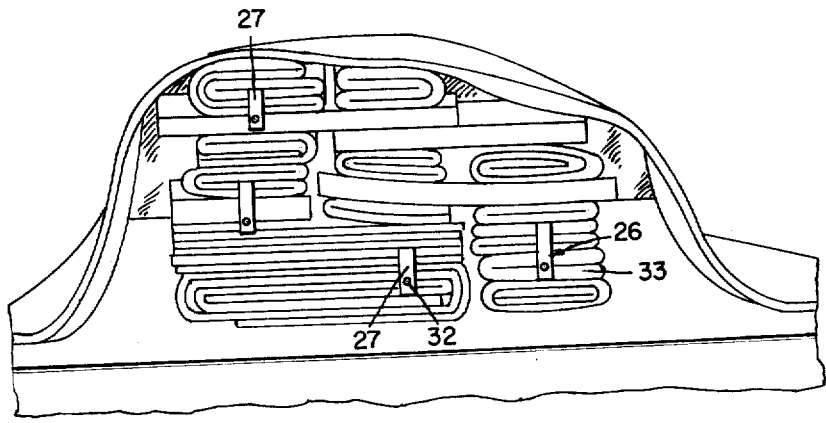
FIG. 5 is a view corresponding to FIG. 1 but showing a second form or embodiment of the invention associated with wrapped packs ready for sterilization.

Referring now more particularly to the drawings and referring first to FIGS. 1 to 4, the sterilization indicator is generally designated 10 and comprises in the illustrated embodiment a capsule of glass or other transparent material of suitable character which is in the form of a long tubular body 12 closed at its ends as indicated at 14 and 16. Adjacent to one end the tubular body is formed with an encircling constriction 18 which provides an annular channel. There is attached to the transparent capsule a cord or similar strandlike body which is designated 20 and this is looped intermediate its ends as indicated at 21, and the loop is engaged around the capsule within the constriction or channel 18 formed by such constriction, leaving the ends of the cord free, as shown.

The flexible strand 20 has here been described as shown as a cord looped intermediate its ends and attached to the capsule by engaging the loop in the constriction so that the two ends of the cord hang free, but the invention is not to be understood as being limited to this specific arrangement as obviously the strand may be secured in any suitable manner in the constriction 18, to depend from the body 12.

Within the capsule there is placed a pellet 22 formed of a suitable substance which will fuse at the desired temperature and this substance is impregnated with a heat sensitive pigment which is of a character to change color when the temperature of the air around the capsule reaches 250° F., or when it dissolves in the fused pellet.

Many dyes or coloring substances generically referred to as "ink" are obtainable which will change color at a prescribed temperature and accordingly no specifically identified dye or ink of this character is set forth herein, the only requirement being that such dye of a heat sensitive nature be of a type or character to change its color at the sterilization temperature indicated, or that the color change will become evident after fusion of the pellet. Preferably the fusible pellet 22 is initially of yellow color and is designed when heated to sterilization temperature to turn red.

The free ends of the strand attached to the capsule have a portion thereof impregnated with a heat sensitive ink which will turn black or assume another contrasting color when subjected to the sterilization temperature stated. In FIG. 2 the ink carrying portions of the strand ends are designated 23.

FIG. 3 is a duplication of FIG. 2 with the exception that it illustrates the changed condition of the indicator after the capsule and the ends of the strand have been subjected to the sterilization temperature and accordingly in this figure the pellet in its changed or fused condition is designated 22' and is shown as being changed in color. Also the heat sensitive ink on the ends of the strand is shown of changed color and in this changed condition is designated 23'. While it is hereinabove stated that the fusible pellet prior to melting may be of yellow color and after melting or fusion it turns red, it is to be understood that the invention is not limited to these specific colors nor to the specific color mentioned for the ends of the strand and accordingly the pellet in the unfused and fused condition and the colored ends of the strands in the two conditions mentioned therefor are not lined for a specific color.

In the use of the invention in the embodiment just described the transparent capsule is placed in the center of a wrapped pack of surgical instruments or other bodies to be sterilized and in FIG. 1 a number of such packs are shown and each is generally designated 24 and the piled packs are shown covered by a suitable cover 25, which may be a towel, as is customary practice in sterilizing in an autoclave.

The transparent capsule is placed in the pack in the manner stated with the strand 20 hanging free from an end of the pack so that when the packs are stacked the strands will all be exposed to view and they are placed so that they may be readily observed through the window of the autoclave.

Figure 6:
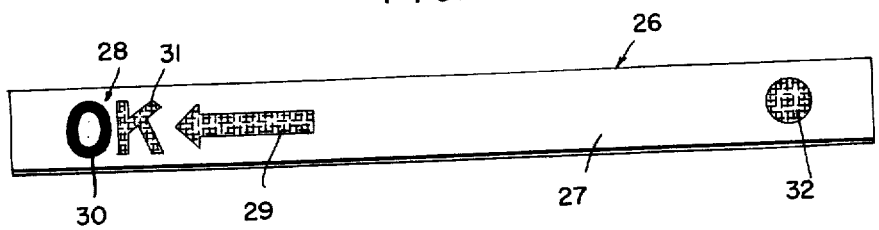
FIG. 6 is a view in perspective of the second embodiment of the sterilization indicator and illustrating a strip body and the placement thereon of the heat sensitive ink or other substance and its character prior to being subjected to sterilization temperature.
Figure 7:
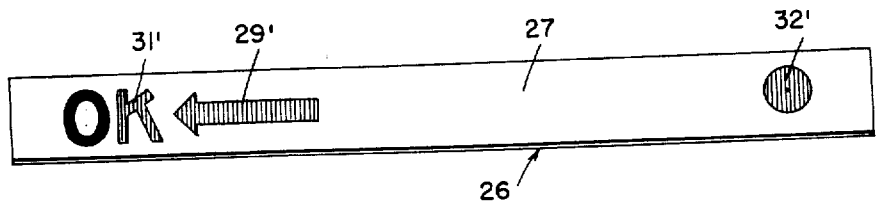
FIG. 7 is a view corresponding to FIG. 6 and illustrating the changed condition of the heat sensitive material following the subjection thereof to sterilization temperature.

In the second embodiment of the invention illustrated in full in FIGS. 6 and 7 the elongate article carrying the heat sensitive ink is generally designated 26 and is in the form of a ribbon body 27 of suitable material which may be paper or any other substance upon which the desired heat sensitive inks may be placed and also upon which suitable instructions for use may be printed. In this strip or ribbon form of the invention one surface or one face of the strip adjacent to one end thereof preferably is printed with the letters OK, as indicated at 28 and adjacent to the letter K an arrow 29 is printed on the strip. The letter O designated at 30 is printed with conventional ink which is insensitive to heat while the letter K designated at 31 and the arrow 29 are printed with the heat sensitive white, pale yellow or substantially invisible ink which is of the proper character to change color when it is subjected to the sterilization temperature.

At the opposite end of the strip body 27 the same surface as that carrying the other symbols has a symbol or legend thereon which is preferably in the form of a dot, as here illustrated and designated at 32. This legend or dot 32 or other symbol is also printed with the transparent or substantially colorless heat sensitive ink.

FIG. 7 illustrates the changed condition of the symbols or legends on the strip after the two end portions have been subjected to heat at a sterilization temperature and in this figure the changed character of the letter K is designated 31' and that of the previously transparent or nearly invisible arrow in its changed condition is designated 29'. The dot or other legend at the opposite end of the strip previously designated 32 is shown in its changed condition and designated 32'.

The use of the second embodiment of the sterilization indicator is the same as described in connection with the indicator 10 and in FIG. 5 there are shown diagrammatically a number of wrapped packs which are designated 33 in stacked arrangement within an autoclave and in each of which the end of an indicator carrying the OK symbol and arrow is positioned to be in the center thereof close to the articles to be sterilized. The opposite end portion of the indicator strip carrying the dot or other symbol 32 hangs from the end of the pack in the manner illustrated in a position where it can be seen by an observer, without requiring that the strip be removed from the pack.

From the description given of the manner of using the sterilization indicator in either of its two forms or embodiments it will be seen that first when the autoclave containing the wrapped packs has been operated for the proper time in the proper manner, the exposed ends of the indicators will change color so that an observer can see that the sterilization temperature has been reached. If any one of the packs has been improperly prepared so that air is entrapped therein around the instruments or other articles and the desired 250° F. temperature has not been attained, the heat sensitive ink or heat sensitive chemical on the end of the elongate indicator article located within the pack will not change its color or assume the color or hue which indicates sterilization and thus when the pack is taken out and opened it will be seen at once that the articles have not been sterilized.

In the sterilization of articles in the manner stated it is usual practice to take the packs out and store them in the proper place awaiting use of the articles therein. Accordingly when the stacks are taken from the sterilizer and stored ready for use, if a pack which had not been in the sterilizer should get in with those taken from the sterilizer, this would be at once indicated by the fact that the exposed end of the sterilization indicator had not changed color and the possibility of instruments being used which had not been sterilized would thus be avoided.

It will also be apparent from the foregoing that the present invention gives a double protection or double assurance of sterility when used in the manner described. In other words, the indicator not only gives a showing or indication of sterility in the general area of the inside chamber of the sterilizer or autoclave but more specifically reveals a situation where the free space in the chamber is under steam conditions which should assure steriilty while the specific area inside the pack in which the air may be entrapped, may not be at a temperature to produce sterility.

I claim:

1. In the autoclave sterilization of wrapped medical and surgical articles, the method of signifying when such articles have been subjected to a sterilizing temperature which comprises placing within a wrapper with such articles a heat sensitive indicator capable of acquiring a definite hue when subjected to the sterilizing temperature, and maintaining outside of the wrapper and in a position to be seen a corresponding heat sensitive indicator capable of acquiring a definite hue when subjected to the desired sterilizing temperature.

2. The method of insuring sterilization in an autoclave of a wrapped article which comprises wrapping with the article a heat sensitive substance of a character to assume a definite hue when subjected to a sterilization temperature and maintaining in the autoclave exteriorly of the article wrapper and in a position to be seen without removal of the indicator from the pack a similar substance capable of assuming a definite hue when the sterilizing temperature is attained in the autoclave.

3. A sterilization indicator comprising an elongate article carrying on one end portion thereof a substantially invisible indicating substance having the characteristic of becoming clearly visible when subjected to a predetermined sterilizing temperature and carrying on the other end thereof another substantially invisible indicating substance having the characteristic of becoming clearly visible when subjected to said predetermined sterilizing temperature.

4. A sterilization indicator comprising an elongate article, means carried thereby adjacent to one end thereof for indicating by a visible permanent change of such means an ambient temperature of a degree to effect sterilization of a body adjacent thereto, and means spaced a substantial distance from said first mentioned means carried by the article adjacent to the other end thereof for indicating by a visible permanent change in the latter means an ambient atmosphere temperature remote from the first means.

5. A sterilization indicator comprising a flexible body of tape-like character, an information imparting symbol printed in a heat sensitive ink on a surface of the body adjacent to one end thereof, and an information imparting symbol printed in a heat sensitive ink on said surface of the body adjacent to the other end thereof, said inks being of a character to assume an informative hue when subjected to a predetermined sterilization temperature.

6. A sterilization indicator comprising a hollow transparent body, a pellet of fusible substance therein, the substance being impregnated with a heat sensitive substance, said fusible and heat sensitive substances being characterized respectively by melting and assuming a definite informative hue when subjected to a sterilization temperature, and a strand of material attached at one end to said body and carrying adjacent to its other end a heat sensitive substance of a character to assume a definite informative hue when subjected to a sterilization temperature.

7. An indicator as defined in claim 6 wherein one of said symbols comprises a "K," a letter "O" printed in permanent ink on said body directly to the left of the symbol "K," the other of said symbols comprising a circular dot.

8. A sterilization indicator comprising a hollow body having a transparent wall, means within the body and viewable through said wall which is heat sensitive to assume an informative hue when subjected to a sterilization temperature and a strand of material having one end secured to said body and carrying a heat sensitive means adjacent to its other end which will assume an informative hue when subjected to a sterilization temperature.

9. An autoclave for sterilizing instruments, a wrapping in said autoclave, an instrument enclosed in said wrapping, a sterilization indicator comprising an elongated article having one end adjacent said instrument and enclosed by said wrapping, a substantially invisible indicating substance on said one end having the characteristic of becoming clearly visible when said instrument is subjected to a predetermined sterilizing temperature, said sterilization indicator having another end projecting outside of said wrapping, said other end including substantially invisible indicating substance thereon having the characteristic of becoming clearly visible when subjected to a predetermined sterilizing temperature in said autoclave.

10. The method of insuring sterilization in an autoclave of a wrapped instrument which comprises the steps of providing an elongated member having on opposite ends thereof a heat sensitive substance of a character to assume a definite hue when subjected to a sterilization temperature, wrapping one end of the member adjacent said instrument in such a manner that the other end of said member extends exteriorly of the wrapping and is exposed to view.

References Cited in the file of this patent

UNITED STATES PATENTS

| | | |
|---|---|---|
| 2,046,863 | Allphin | July 7, 1936 |
| 2,118,144 | Berman | May 24, 1938 |
| 2,195,395 | Chapman | Apr. 2, 1940 |
| 2,579,738 | Hargreaves | Dec. 25, 1951 |
| 2,606,654 | Davis et al. | Aug. 12, 1952 |
| 2,826,073 | Huyck et al. | Mar. 11, 1958 |
| 2,856,885 | Huyck | Oct. 21, 1958 |
| 2,856,886 | Huyck | Oct. 21, 1958 |

Disclaimer 3,114,349.—*Seymour Schuman*, New York, N.Y. STERILIZATION INDICATORS. Patent dated Dec. 17, 1963. Disclaimer filed Mar. 27, 1978, by the assignee, *Propper Manufacturing Co., Inc.*

Hereby enters this disclaimer to claim 4 of said patent.

[*Official Gazette June 19, 1979.*]